(12) United States Patent
Velusamy et al.

(10) Patent No.: US 9,767,828 B1
(45) Date of Patent: Sep. 19, 2017

(54) ACOUSTIC ECHO CANCELLATION USING VISUAL CUES

(75) Inventors: Kavitha Velusamy, San Jose, CA (US);
Wai C. Chu, San Jose, CA (US);
Ramya Gopalan, Cupertino, CA (US);
Amit S. Chhetri, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 959 days.

(21) Appl. No.: 13/535,232

(22) Filed: Jun. 27, 2012

(51) Int. Cl.
*G06K 9/00* (2006.01)
*G10L 25/78* (2013.01)
*H04N 21/442* (2011.01)
*H04B 3/23* (2006.01)

(52) U.S. Cl.
CPC ............... *G10L 25/78* (2013.01); *H04B 3/23* (2013.01); *G06K 9/00268* (2013.01); *H04B 3/231* (2013.01); *H04N 21/44218* (2013.01)

(58) Field of Classification Search
CPC . G01S 3/7865; G01S 3/8083; G06K 9/00268; G06K 9/6293; G06K 9/685; H04B 3/23; H04B 3/231; G10L 25/78; H04N 21/44218
USPC ......................................................... 348/143
See application file for complete search history.

(56) References Cited

U.S. PATENT DOCUMENTS

| 5,621,858 A * | 4/1997 | Stork ................ G06K 9/00268 382/156 |
| 6,243,462 B1 * | 6/2001 | Chujo ...................... H04B 3/23 379/406.1 |
| 6,483,532 B1 * | 11/2002 | Girod ..................... H04N 7/142 348/14.12 |
| 6,593,956 B1 * | 7/2003 | Potts ...................... G01S 3/7865 348/14.09 |
| 7,418,392 B1 | 8/2008 | Mozer et al. |
| 7,720,683 B1 | 5/2010 | Vermeulen et al. |
| 7,774,204 B2 | 8/2010 | Mozer et al. |
| 2003/0177006 A1 * | 9/2003 | Ichikawa ............ G10L 21/0216 704/231 |
| 2004/0120510 A1 * | 6/2004 | LeBlanc .................. H04B 3/23 379/406.01 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Christopher S Kelley
*Assistant Examiner* — Deirdre Beasley
(74) *Attorney, Agent, or Firm* — Lee & Hayes, PLLC

(57) ABSTRACT

Techniques for enhancing an acoustic echo canceller based on visual cues are described herein. The techniques include changing adaptation of a filter of the acoustic echo canceller, calibrating the filter, or reducing background noise from an audio signal processed by the acoustic echo canceller. The changing, calibrating, and reducing are responsive to visual cues that describe acoustic characteristics of a location of a device that includes the acoustic echo canceller. Such visual cues may indicate that no human being is present at the location, that some subject(s) are engaged in speaking or sound generating activities, or that motion associated with an echo path change has occurred at the location.

24 Claims, 5 Drawing Sheets

(56) References Cited

U.S. PATENT DOCUMENTS

| | | | |
|---|---|---|---|
| 2005/0226398 A1* | 10/2005 | Bojeun | H04L 12/2854 379/93.15 |
| 2006/0217969 A1* | 9/2006 | Sukkar | H04B 3/23 704/219 |
| 2006/0224382 A1* | 10/2006 | Taneda | G10L 15/25 704/233 |
| 2008/0147411 A1* | 6/2008 | Dames | G10L 15/20 704/275 |
| 2008/0192901 A1* | 8/2008 | Mumm | G10L 17/22 379/88.02 |
| 2009/0006093 A1* | 1/2009 | Das | G10L 17/10 704/246 |
| 2009/0016333 A1* | 1/2009 | Wang | H04L 65/80 370/389 |
| 2009/0043577 A1* | 2/2009 | Godavarti | G10L 21/02 704/233 |
| 2010/0088093 A1* | 4/2010 | Lee | G10L 15/22 704/233 |
| 2011/0058667 A1* | 3/2011 | Takada | H04M 9/082 379/406.08 |
| 2012/0201370 A1* | 8/2012 | Mazurenko | H04B 3/23 379/406.1 |
| 2012/0223885 A1 | 9/2012 | Perez | |
| 2013/0185072 A1* | 7/2013 | Huang | G10L 15/30 704/246 |
| 2014/0308025 A1* | 10/2014 | Jarvinen | H04N 5/772 386/248 |

\* cited by examiner

ACOUSTIC ECHO CANCELLATION USING VISUAL CUES

BACKGROUND

Many electronic devices enable voice communication. These devices often face practical problems such as echo, noisy environments and so forth. In the case of echo, a communication device receives a far end signal from a far end talker typically over a network. The far end signal may be played via a loudspeaker of the communication device while a near end talker is speaking into microphones of the communication device. The near end talker may be relatively far away from the microphones as compared to a distance of the loudspeaker from the microphones. Accordingly, sound played out of the loudspeaker corresponding to the far end signal may echo and reach the microphones at roughly the same time as sound from the near end talker. This situation is referred to as "double talk".

The performance of the communication device is degraded when the device fails to properly detect double talk, for instance, when the echo canceller continues to adapt during double talk periods, it might diverge and hence unable to remove the echo. Additionally, the presence of background noise from sources such as TV, radio, microwave, or other devices in the room, may further contribute to decreased acoustic performance of the device when attempting to listen to the intended near talker. It is desired to improve the acoustic performance by minimizing the effects of background noise and accurately detect double talk for improved echo canceller performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
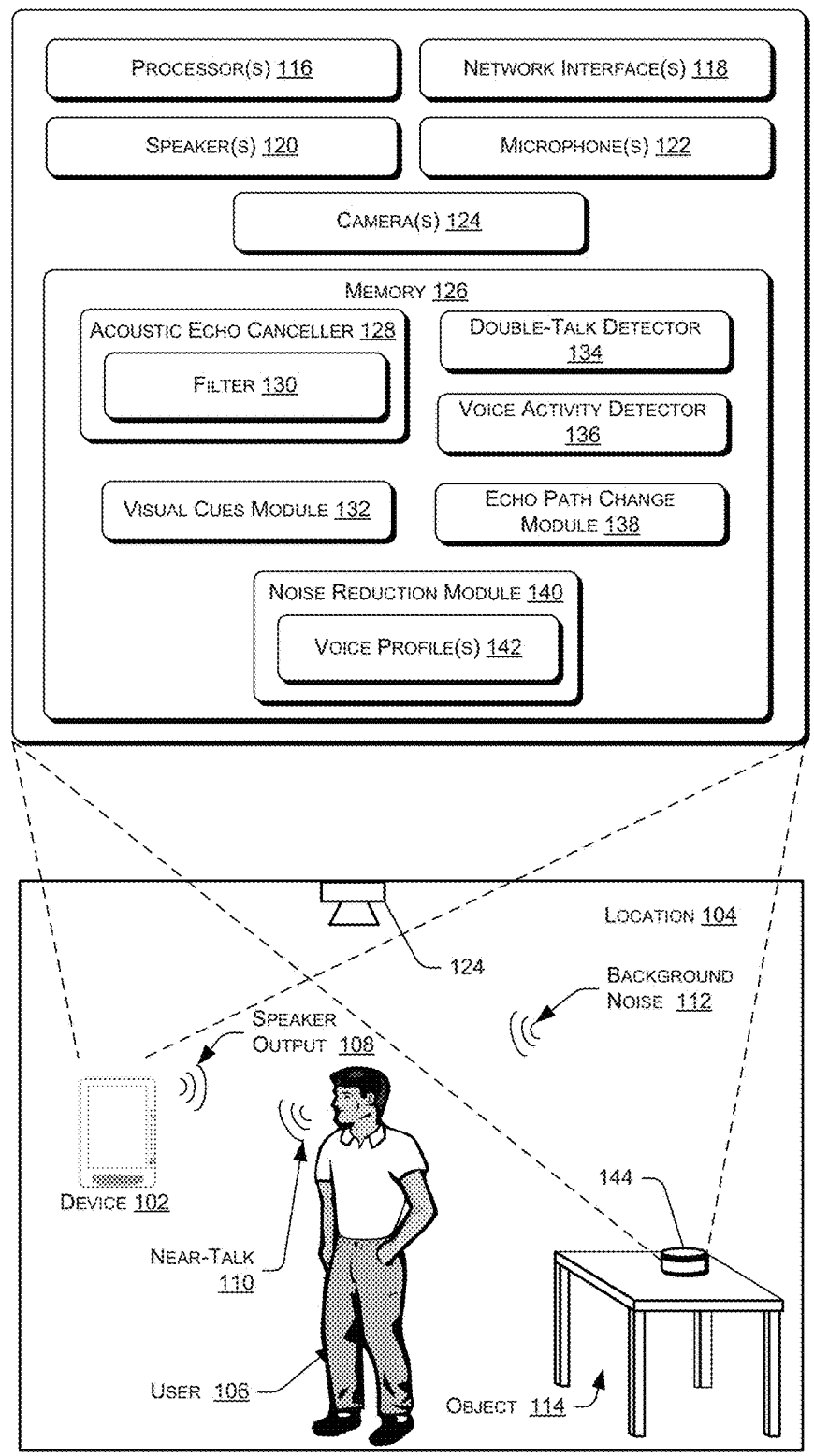
FIG. 1 illustrates example devices used by a person at a location to engage in a dialog. The device is configured to receive visual cues describing the acoustic environment of the location and to adapt or calibrate a filter of an acoustic echo canceller of the devices based at least in part on the visual cues.

This disclosure describes, in part, techniques for enhancing an acoustic echo canceller based on visual cues. The acoustic echo canceller (also referred to herein as an "acoustic echo processor") may be incorporated in a device, such as a telecommunications device, an electronic reading device, a tablet computing device, a voice controlled assistant, and so forth. Such a device may enable a user to communicate with another, remote user through an audio or audiovisual conversation. One well-known challenge to conversations involving audio, however, is the acoustic echo. An acoustic echo is an audio signal captured by a microphone of the device that corresponds to speech of the remote conversation partner (e.g., also known as a far end talker) which has been played by the speaker of the device. When this acoustic echo is then relayed to and output by a speaker of the remote conversation partner's device, the remote conversation partner will have his or her speech played back, causing the remote conversation partner to experience a slightly delayed echo of his or her voice. To prevent this transmission of audio that corresponds to an acoustic echo, devices that enable audio conversations often include acoustic echo cancellers. An acoustic echo canceller captures the audio played to the loudspeaker and utilizes that audio as a reference signal. The acoustic echo canceller also includes a filter that adaptively learns the echo path(s) (i.e., the "impulse response" of the environment) between the loudspeaker(s) and the microphone(s) of the device. Based on the reference signal and the filter, the acoustic echo canceller estimates echo of the audio played through the loudspeaker(s) and removes, at least in part, the estimated echo from the signal captured at the microphone(s).

Acoustic echo cancellers are, however, subject to a number of challenges. One of the challenges is determining when a double talk scenario happens and/or when an echo path changes. An echo path changes as a result of movement of people or objects within the acoustic environment, thereby changing the path in which sound travels between the loudspeaker(s) and the microphone(s). For example, an adaptive filter should stop or slow down the adaptation during double talk. If the adaptive filter adapts, and the near talker is talking, the filter coefficients will diverge causing poor performance of the echo canceller. On the contrary, when echo path changes, the adaptive filter should be accelerated to capture that change in the filter coefficients. To determine when the user (or near talker) is speaking, the acoustic echo canceller may utilize one or both of a double-talk detector and a voice activity detector to detect the user's speech. Each of these detectors, however, consumes device resources.

In various embodiments described herein, a vision system communicates with the device having the acoustic echo canceller to drive adaptation of the filter based on visual cues. The vision system may include a camera and visual cues module. These components may form part of the device, may be implemented as a remote device or devices, or may be distributed in both the device and remote device(s). The visual cues module is configured to recognize occurrence of any of a number of scenarios. In a first scenario, the visual cues module determines that the image(s) show that no one is presently at the location. For example, the location may be a room, and the user may not be in the room. In a second scenario, the visual cues module determines that the image(s) depict a person at the location engaged in speaking. This person may be the user or another person who is at the location. In a third scenario, the visual cues module determines that the image(s) depict motion associated with an echo path change.

In various embodiments, upon determining that the image(s) show that no one is at the location, the visual cues module provides an indication to the acoustic echo canceller that no one is at the location. In response to receiving the indication, the acoustic echo canceller causes a speaker of the device to play any calibration sound, such music, chirp, or white noise (i.e., white noise is a random signal with a flat power spectral density). While the speaker plays the calibration sound, one or more microphones of the device capture an audio signal that includes a version of the calibration sound distorted by the location. These distortions may reflect acoustic characteristics of the location and thus can be used to determine the echo path(s). The acoustic echo canceller then determines the echo path(s) from the played calibration sound and the captured audio signal and calibrates the coefficients of the adaptive filter that is part of the echo canceller based on the echo path(s). Calibrating the filter may involve adjusting one or more coefficients of the filter. Once the filter is calibrated and the coefficients determined, the filter coefficients are saved in memory for future use.

In further embodiments, upon determining that the image(s) depict a person at the location engaged in speaking, the visual cues module provide an indication to one of a double-talk detector or a voice activity detector that a person is engaged in speaking. In response, the double-talk detector or voice activity detector adjusts a confidence score associated with its determination that an entity, such as a person, is speaking near a microphone of the device. If the confidence score exceeds a threshold, the acoustic echo canceller changes adaptation of the filter (e.g., by halting or slowing the adaptation).

In some embodiments, if the indication that a person is engaged in speaking is provided to the voice activity detector, the output of the voice activity detector may also be used to affect reduction of background noise from an audio signal by a noise reduction module of the device. The noise reduction module of the device may receive the audio signal after it has been processed by the acoustic echo canceller and may remove background noise from the audio signal. In some embodiments, the background noise module learns about the background noise when it is determined that there is no one talking in the room. It then uses that information to cancel the background noise. By removing background noise at these times, the user's speech may be represented more clearly in the audio signal.

In various embodiments, as mentioned above, the visual cues module determines that the image(s) depict motion associated with an echo path change. The visual cues module may utilize various image analysis techniques in making this determination. In some embodiments, the visual cues module may first determine if any objects at the location depicted in the images have changed their positions during a specified time frame or if a single image depicts an object in a position associated with motion (e.g., by a model). For each object that has changed position, the visual cues module may further determine the magnitude of the position change, the size of the object, and the proximity of the object to a microphone incorporated in or communicatively coupled to the device. The visual cues module may then utilize these cues and a set of rules or heuristics to determine whether the movement of any of the objects is associated with an echo path change. Upon determining that the motion is associated with an echo path change, the visual cues module provides an indication to an echo path change module of the device of the echo path change. Responsive to receiving the indication, the echo path change module directs the acoustic echo canceller to accelerate adaptation of the filter to capture the impulse response change associated with this echo path change.

Example Device and Environment

FIG. 1 illustrates an example environment 100 in which a person uses a device 102 at a location 104 to engage in a conversation. The device 102 is configured to receive visual cues describing the acoustic environment of the location and to adapt or calibrate a filter of an acoustic echo canceller of the device based at least in part on the visual cues. As illustrated, the device 102 is implemented as a tablet, communication device, eBook device, or other type of device having a display. This device 102 may be utilized at the location 104 by a user 106 to engage in an audio or audiovisual conversation with a remote conversation partner. The device 102 outputs conversation from the remote conversation speaker (i.e., the far end talker—not shown) via a speaker output 108 and concurrently captures near-talk 110 of the user 106, background noise 112 from the location 104, and echo from the speaker output. The location 104 may includes one or more objects 114 that may distort or otherwise affect the background noise 112 and echo, as well as camera(s) 124.

As is further shown in FIG. 1, the device 102 includes one or more processors 116, network interface(s) 118, speaker(s) 120, microphone(s) 122, and camera(s) 124. While the speaker(s) 120, microphone(s) 122, and camera(s) 124 are shown as being integrated in the device 102, they may also or instead be positioned at different places in the location and communicate with the device 102 in a wired or wireless fashion. The device 102 further includes memory 126 to store various modules, such as an acoustic echo canceller 128, a filter 130 of the acoustic echo canceller 128, a visual cues module 132, a double-talk detector 134, a voice activity detector 136, an echo path change module 138, a noise reduction module 140, and a voice profile 142.

In various embodiments, the device 102 may be any kind of mobile electronic device (e.g., a laptop computer, a tablet computing device, a telecommunications device, electronic reading device, multifunction communication device, a portable digital assistant (PDA), etc.) or non-mobile electronic device (e.g., a desktop computer, a television, a voice controlled assistant, etc.). For example purposes, a second device 144 is shown positioned on the table 114. The second device 144 is implemented as a voice controlled assistant that is primarily, if not exclusively, controlled by verbal interaction with the user 106. The voice controlled assistant 114 may implement essentially the same components in FIG. 1 as the device 102. In addition, while FIG. 1 illustrates several example components of the devices 102 and 144, it is to be appreciated that the device 102 may also include other conventional components, such as an operating system, system busses, input/output components, and the like.

The location 104 may be an enclosed space, such as a room or office, or alternatively an open space, such as the outdoors. In either a room or the outdoors, different surfaces and objects 114 with different acoustic characteristics may be in some level of proximity to the user 106 and the devices 102 and 144. For example, FIG. 1 illustrates a table 114 being in proximity to the user 106 and the devices 102 and 144. These objects 114, and any surfaces, such as a floor, ground, walls, a ceiling, and even the air at the location 104 all comprise the acoustic space at the location 104, whereby the acoustic space has acoustic characteristics that affect the echo path(s) of audio or other sounds occurring at the location 104 with respect to the microphone(s).

FIG. 1 further illustrates audio and sounds at the location 104. Speakers 120 of the device 102 (or device 144) play the audio speaker output 108, and microphones 122 of the device 102 capture near-talk 110 of the user 102, background noise 112 from the location 104, and a version of the speaker output 108 distorted by the acoustic space of the location 104. As mentioned further herein, the speakers 120 and microphones 122 may be integrated in the device 102, placed at different positions in the location 104, or both.

In some embodiments, as shown, camera(s) 124 may also be placed at different positions in the location 104, capturing different views of the location 104 and the user 106. Alternatively, camera(s) 124 may be located exclusively in the device 102.

As further illustrated in FIG. 1, the device 102 includes processor(s) 116 and network interface(s) 118. The processor(s) 116 may be or include any sort of processing unit, such as a central processing unit (CPU) or a graphic processing unit (GPU). The network interface(s) 118 allow the device 102 to communicate with the remote conversation partner, with an intermediate network, or with one or more other devices or networks. The network interface(s) 118 may send and receive communications through the intermediate network or other networks. The network interface(s) 118 may also support both wired and wireless connection to various networks.

In various embodiments, the speaker(s) 120, microphone(s) 122, and camera(s) 124 include any of speaker(s) 120, microphone(s) 122, and camera(s) 124 that are physically integrated into the device 102 or speaker(s) 120, microphone(s) 122, and camera(s) 124 that are distributed at different places within the location 104 and communicatively coupled to the device 102 through wired or wireless means. The speaker(s) 120, microphone(s) 122, and camera(s) 124 may be any sort of speaker(s) 120, microphone(s) 122, and camera(s) 124 and may store any of the components 128-140 stored in the memory 126 of the device 102. For example, the camera(s) 124 may store the visual cues module 132 or sub-modules of the visual cues module 132.

Depending on the configuration of the device 102, the memory 126 (and other memories described throughout) is an example of computer-readable storage media and may include volatile and nonvolatile memory. Thus, the memory 126 may include, but is not limited to, RAM, ROM, EEPROM, flash memory, or other memory technology, or any other medium which can be used to store media items or applications and data which can be accessed by the device 102.

In various embodiments, as mentioned, the memory 126 stores the acoustic echo canceller 128, which is executable on the processor(s) 116. While the acoustic echo canceller 128 is shown stored in the memory 126 in FIG. 1, the acoustic echo canceller 128 may instead comprise an application-specific memory and processor or may be stored and implemented entirely or partially on a remote device. Regardless of where the acoustic echo canceller 128 is stored, the acoustic echo canceller 128 is configured to cancel the acoustic echo from the audio signal captured by the microphone(s) 122. The acoustic echo includes both a direct path sound of the speaker output 108 captured by the microphone(s) 122 with minimal distortion and reverb, which is the speaker output 108 distorted by the acoustic space of the location 104. To remove the acoustic echo, the acoustic echo canceller 128 utilizes an adaptive filter 130 to filter the signal to be played out through the speaker 120, with the output of the adaptive filter 130 subtracted from the input of the microphones 122. The adaptive filter 130 is continuously adjusted to match the acoustic path of the location 104. (For details on acoustic echo canceller, please refer to Hansler and Schmidt, "Acoustic Echo and Noise Control: A Practical Approach", Wiley-IEEE Press, 2004). The audio signal resulting from the subtraction contains the near-talk 110 and background noise 112, and substantially none of the speaker output 108 or its reverb. This audio signal may then be transmitted back to a communication network, such as a cellular or data network, or may first have the background noise 112 reduced from the signal by a noise reduction module 140.

In various embodiments, the filter 130 is an adaptive filter of the acoustic echo canceller 128. The filter 130 is a model of the acoustic attributes of the speaker(s) 120, the microphone(s) 122, and the location 104 and includes coefficients that are calibrated or otherwise adjusted to progressively improve its specification of those acoustic attributes.

In some embodiments, the acoustic echo canceller 128 calibrates the filter 130 responsive to determining that no one is present at the location 104. This determination may be made responsive to a period of silence or non-use of the device 102, or may be informed by an indication received from the visual cues module 132 that no one is present at the location 104. Responsive to the determination or received indication, the acoustic echo canceller 128 causes the speaker(s) 120 to play a calibration sound, such as music or white noise, and captures the direct path and reverb of the calibration sound using the microphone(s) 122. The acoustic echo canceller 128 then determines the echo path(s) from the audio signal captured by the microphone(s) 122, the echo path(s) reflecting the acoustic characteristics of the location 104. The acoustic echo canceller 128 then calibrates the filter 130 by adjusting its coefficients based on the echo path(s).

The acoustic echo canceller 128 may also adapt the filter 130 on an ongoing basis. In order to accurately filter the captured audio signal, however, the acoustic echo canceller 128 is configured to change adaptation in response to the double-talk detector 134 or voice activity detector 136 indicating that the captured audio signal includes near-talk 110 by the user 106 or in response to the echo path change module 138 indicating the occurrence of an echo path change.

In various embodiments, the visual cues module 132 may be stored in memory 126 and implemented on the device 102, implemented on a camera 124 that is separate from but communicatively coupled to the device 102, or implemented in part on both the device 102 and a separate camera 124. The visual cues module 132 receives image(s) and tests to see if the image(s) depict any specified scenarios, such as the above-described empty room, speaking person, or motion associated with an echo path change. If any of the specified scenarios are depicted, the visual cues module 132 provides an indication to another module of the device 102, such as the acoustic echo canceller 128, the double-talk detector 134, the voice activity detector 136, or the echo path change module 138.

To determine if any of the specified scenarios are depicted, the visual cues module 132 may perform one or more image analysis techniques capable of recognizing objects within image(s). For example, the visual cues module 132 may utilize a model of a person to determine whether an image of the location 104 depicts anyone at the location. Either responsive to determining that a single image does not depict anyone at the location 104 or responsive to determining that a sequence of images captured in a specified time period do not depict anyone at the location 104, the visual cues module 132 provides an indication to the acoustic echo canceller 128 that no one is at the location 104.

In a further example, the visual cues module 132 may determine that the image(s) depict a person and that one or more of those images captured in a specified time period depicts the person's lips moving. If using a single image, the visual cues module 132 may utilize a model of a mouth engaged in speech. The depicted person may be the user 106 or a different individual. The visual cues module 132 may determine that the lips are moving based on comparisons of images to each other, based on a model of a person speaking, or based on both a comparison and a model. Responsive to determining that the image(s) depict a person speaking, the visual cues module 132 provides an indication to either or both of the double-talk detector 134 or the voice activity detector 136 that a person is speaking.

In another example, the visual cues module 132 determines that the image(s) depict motion associated with an echo path change based on recognizing objects in one or more images and determining positions and characteristics of the objects. In some embodiments, the visual cues module 132 may first determine if any objects at the location 104 and depicted in the image(s) have changed their positions during a specified time frame or have a position associated by a model with motion. For each object that has changed position, the visual cues module 132 may further determine the magnitude of the position change, the size of the object, and the proximity of the object to a microphone 122. The visual cues module 132 may then utilize these object characteristics and a set of rules or heuristics to determine whether the movement of any of the objects is associated with an echo path change. Upon determining that the motion is associated with an echo path change, the visual cues module 132 provides an indication to an echo path change module 138 of the echo path change.

In various embodiments, the double-talk detector 134 may be part of the acoustic echo canceller 128 or may be a separate module that is configured to communicate with the acoustic echo canceller 128. The double-talk detector 134 detects when the audio signal captured by the microphone(s) 122 includes near-talk 110. When the audio signal includes only near-talk 110 and no speaker output 108 or reverb of the speaker output 108, detection is easy and can simply involve determining if the audio signal includes speech characteristics. However, when the audio signal includes both near-talk 110 and one or both of speaker output 108 or reverb of the speaker output 108, a situation known as "double-talk" occurs. To determine that double-talk is occurring—and that, hence, the audio signal includes near-talk 110—the double-talk detector 134 calculates a value based off of the reference signal and the captured audio signal and compares it to a threshold. Based on the comparison, the double-talk detector 134 calculates a confidence score associated with the comparison and instructs the acoustic echo canceller 128 to change adaptation of the filter 130 (e.g., by halting or slowing adaptation) when the confidence score exceeds a threshold (indicating the presence of double-talk). In some embodiments, as mentioned, the double-talk detector 134 receives an indication from the visual cues module 132 that a person is speaking at the location 104. Responsive to receiving the indication, the double-talk detector 134 increases the confidence score to reflect the higher likelihood that the audio signal includes near-talk 110.

In further embodiments, the voice activity detector 136 may be part of the acoustic echo canceller 128 or may be a separate module that is configured to communicate with the acoustic echo canceller 128. The voice activity detector 136 detects when the audio signal captured by the microphone(s) 122 includes a voice. The voice may include any or all of near-talk 110, speaker output 108, or the reverb of speaker output 108. To determine that the audio signal includes a voice, the voice activity detector 136 may utilize any or all of speech characteristics, the reference signal, or a voice profile associated with the user 106. Based on the determination, the voice activity detector 136 calculates a confidence score associated with the determination and instructs the acoustic echo canceller 128 to change adaptation of the filter 130 (e.g., by halting or slowing adaptation) when the confidence score exceeds a threshold. In some embodiments, as mentioned, the voice activity detector 136 receives an indication from the visual cues module 132 that a person is speaking at the location 104. Responsive to receiving the indication, the voice activity detector 136 increases the confidence score to reflect the higher likelihood that the audio signal includes a voice.

In some embodiments, the voice activity detector 136 further informs the noise reduction module 140 of the device that the audio signal includes a voice audio signal. The voice activity detector 136 may inform the noise reduction module 140 responsive to a request from the noise reduction module 140 or in response to receiving an indication from the visual cues module 132 that a person at the location 104 is engaged in speaking.

In various embodiments, the echo path change module 138 may be part of the acoustic echo canceller 128 or may be a separate module that is configured to communicate with the acoustic echo canceller 128. The echo path change module 138, as mentioned, receives an indication from the visual cues module 132 that motion associated with an echo path change has occurred. Responsive to receiving the indication, the echo path change module 138 instruct the acoustic echo canceller 128 to accelerate adaptation of the filter 130. After a period of time has elapsed, the acoustic echo canceller 128 may then slow adaptation of the filter 130 to reflect an end to the echo path change.

In further embodiments, the noise reduction module 140 suppresses or cancels an audio signal associated with the background noise 112 from the audio signal processed by the acoustic echo canceller 128. Thus, the audio signal processed by the noise reduction module 140 is a product of the acoustic echo canceller 128 with the acoustic echo substantially removed. This audio signal received by the noise reduction module 140 substantially comprises, then, the near talk 110 and the background noise 112. In order to suppress or reduce the background noise 112 from the audio signal, the noise reduction module 140 utilizes a voice profile 142 associated with the user 106, speech characteristics, or both to identify the near-talk 110 in the audio signal. Parts of the audio signal that do not correspond to the near-talk 110 are then suppressed or removed more aggressively by the noise reduction module 140 than the parts that correspond to near talk. In some embodiments, the noise reduction module 140 performs the noise reduction responsive to receiving an audio signal from the acoustic echo canceller 128. In other embodiments, the noise reduction module 140 performs the noise reduction responsive to receiving an indication from the voice activity detector 136 that the received audio signal includes a voice, thus changing parameters of the noise reduction module 140 suitably at times when the audio signal does not include a voice. After reducing the background noise 112, the noise reduction module 140 may provide the resulting audio signal to the communications network for transmission to the remote conversation partner.

In some embodiments, the noise reduction module 140 may learn background noise characteristics when no voice activity is detected over a specific time span. The noise reduction module 140 may then use these background noise characteristics in reducing the background noise 112.

In some instances, the electronic device 102 may have features or functionality in addition to those that FIG. 1 illustrates. For example, the device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 102 may reside remotely from the device 102 in some implementations. In these implementations, the device 102 may utilize the network interface(s) 118 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 2:
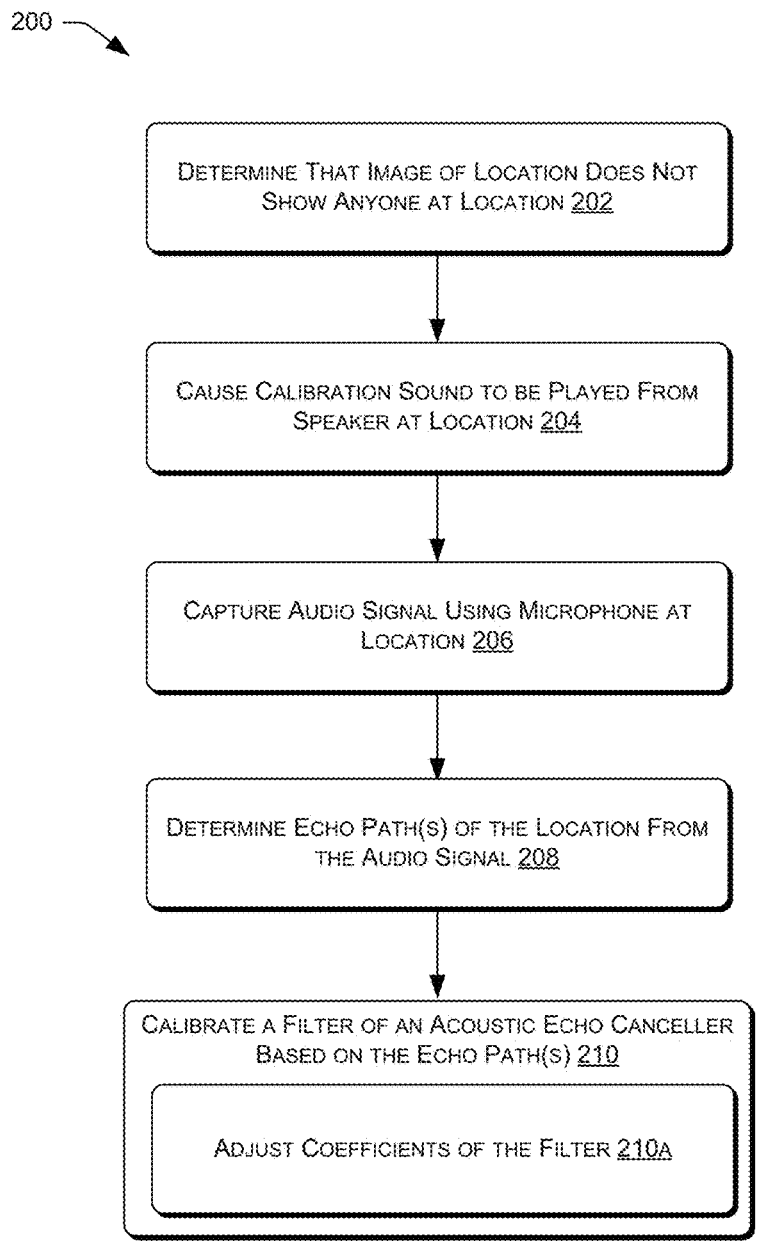
FIG. 2 illustrates an example process for using visual cues to determine whether people are at the location and calibrating the acoustic echo canceller filter when no one is present.

FIG. 2 illustrates an example process 200 for using visual cues to determine whether people are at a location and calibrating an acoustic echo canceller filter when no one is present. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 200 includes, at 202, determining that an image of a location shows that no person is at the location. In one implementation, a camera at the location captures one or more images, and the visual cues module performs makes the determination by utilizing one or more image analysis techniques on the captured image(s). Upon determining that the image(s) show no one being at the location, the visual cues module provides an indication that no one is present at the location to an acoustic echo canceller of a device positioned at the location. In some embodiments, the device is one of a telecommunication device, an electronic reading device, or a tablet computing device.

At 204, the acoustic echo canceller, responsive to receiving the indication from the visual cues module, causes a calibration sound to be played from a speaker of the device that includes the acoustic echo canceller. In some embodiments, the calibration sound may be music, white noise, or other audio signals.

At 206, one or more microphones of the device capture an audio signal while the calibration sound is played. The one or more microphones may be a plurality of microphones located at positions in the location. At 208, the acoustic echo canceller determines the echo paths of the location based on the captured audio signal. The echo paths are indicative of acoustic characteristics of the location.

At 210, the acoustic echo canceller calibrates a filter of the acoustic echo canceller based on the echo paths. At 210A, this calibration includes adjusting one or more coefficients of the filter based on the echo paths.

Figure 3:
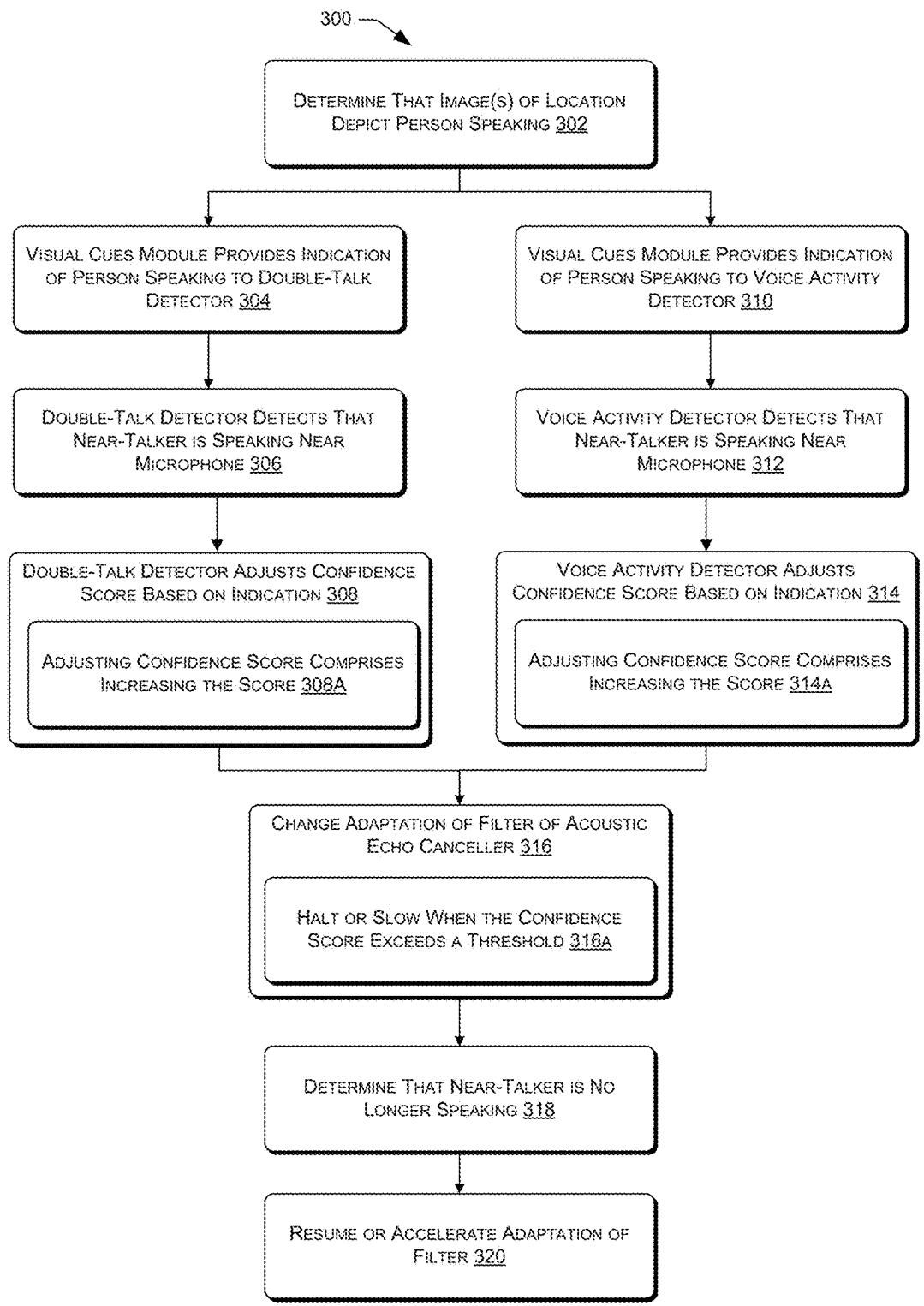
FIG. 3 illustrates an example process for using visual cues of a person speaking to adjust a confidence score(s) associated with the output of a double-talk detector and a voice activity detector.

FIG. 3 illustrates an example process 300 for using visual cues of a person speaking to adjust a confidence score associated with output of a double-talk detector or a voice activity detector. The process 300 includes, at 302, a visual cues module determining that image(s) of a location depict a person at the location engaged in speaking. In some embodiments, this determination includes determining if multiple images of the location show a movement of the person's lips in a specified time period.

At 304, in some embodiments, the visual cues system then provides an indication to a double-talk detector of an acoustic echo canceller of a device at the location that a person is engaged in speaking. In response, the double-talk detector, at 306, detects whether an entity, such as a person, is speaking near one or more microphones of the device based on an audio signal captured by the microphone(s). The entity may be identical with the depicted person or may be a different individual. This determination by the double-talk detector is associated with a confidence score indicating a level of trustworthiness associated with the determination. At 308, the double-talk detector adjusts the confidence score based at least in part on the received indication. For example, at 308A, the double-talk detector may increase the confidence score associated with a determination that an entity is speaking responsive to the received indication.

At 310, in some embodiments, the visual cues system then provides an indication to a voice activity detector of an acoustic echo canceller of a device at the location that a person is engaged in speaking. In response, the voice activity detector, at 312, determines whether an entity is speaking near one or more microphones of the device based on an audio signal captured by the microphone(s). The entity may be identical with the depicted person or may be a different individual. This determination by the voice activity detector is associated with a confidence score indicating a level of trustworthiness associated with the determination. At 314, the voice activity detector adjusts the confidence score based at least in part on the received indication. For example, at 314A, the voice activity detector may increase the confidence score associated with a determination that an entity is speaking responsive to the received indication.

At 316, the acoustic echo canceller may change adaptation of a filter of the acoustic echo canceller, e.g., by halting or slowing adaptation of the filter, based on the determination of double-talk and the confidence score. For example, at 316A, if the confidence score exceeds a threshold, the acoustic echo canceller halts or slows adaptation. The acoustic echo canceller halts or slows the adaptation so that the filter coefficients are not corrupted by the entity's audio.

At 318, the acoustic echo canceller determines that the entity is no longer speaking. This determination may be based on analysis of the captured audio signal, on analysis of image(s) captured by the visual cues system, or both. At 320, in response, the acoustic echo canceller resumes or accelerates adaptation of the filter.

Figure 4:
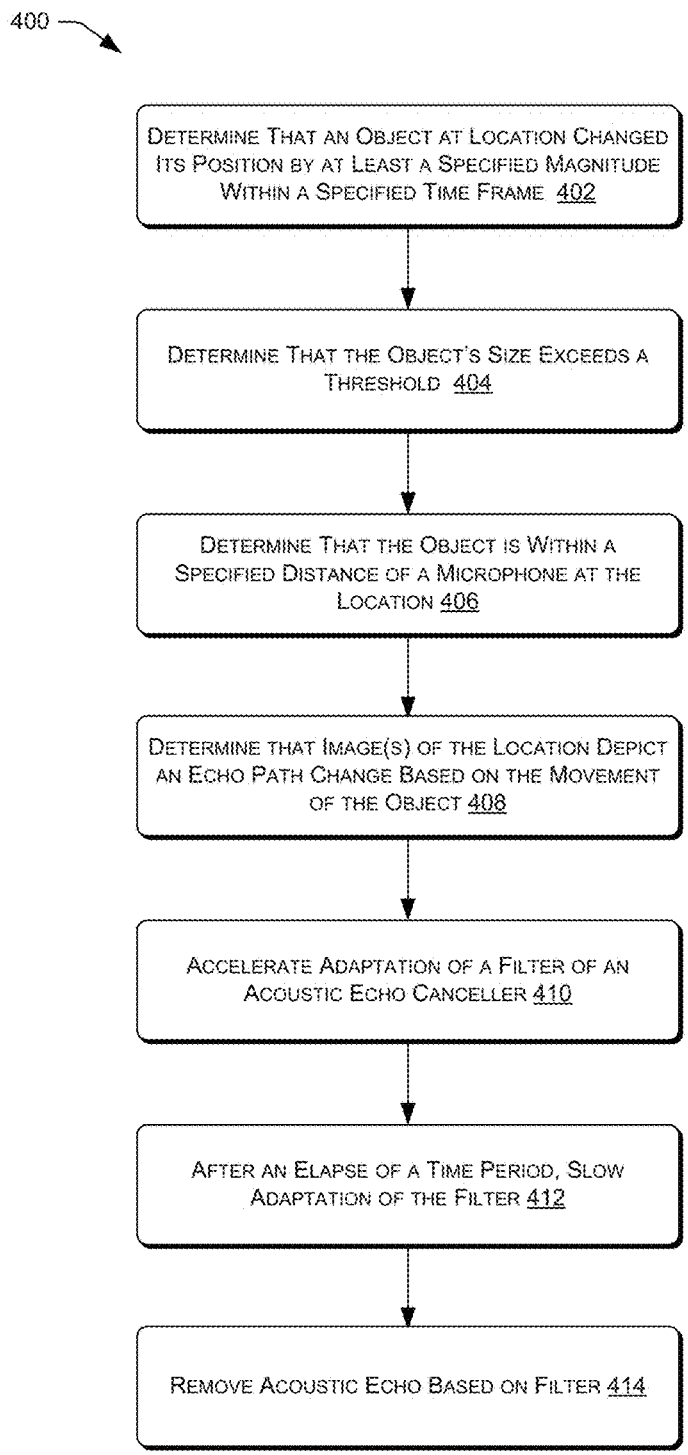
FIG. 4 illustrates an example process for using visual cues to determine when an echo path has changed, and accelerating adaptation of the filter of the acoustic echo canceller in response.

FIG. 4 illustrates an example process 400 for using visual cues to determine when an echo path at the location has changed, and accelerating adaptation of a filter of an acoustic echo canceller in response. The process 400 includes, at 402, determining by a visual cues module that one or more images of a location depict an object at the location experiencing a position change of at least a specified magnitude within a specified time. At 404, the visual cues module may further determine that the depicted object has a size exceeding a threshold. And at 406, the visual cues module may also determine that the depicted object is within a specified distance of a microphone at the location.

Based on the acts of 402-406, the visual cues module, at 408, determines that the image(s) depict motion indicative of an echo path change. The visual cues module then provides an indication of the echo path change to an echo path change module associated with an acoustic echo canceller of a device at the location.

At 410, responsive to receiving the indication, the echo path change module causes the acoustic echo canceller to accelerate adaptation of a filter of the acoustic echo canceller.

At 412, after an elapse of a time period, the acoustic echo canceller slows adaptation of the filter to reflect an end to the echo path change.

At 414, based on the filter, the acoustic echo canceller removes an acoustic echo that includes background noise and an acoustic echo from the speaker from the audio signal received by one or more microphones of the device.

Figure 5:
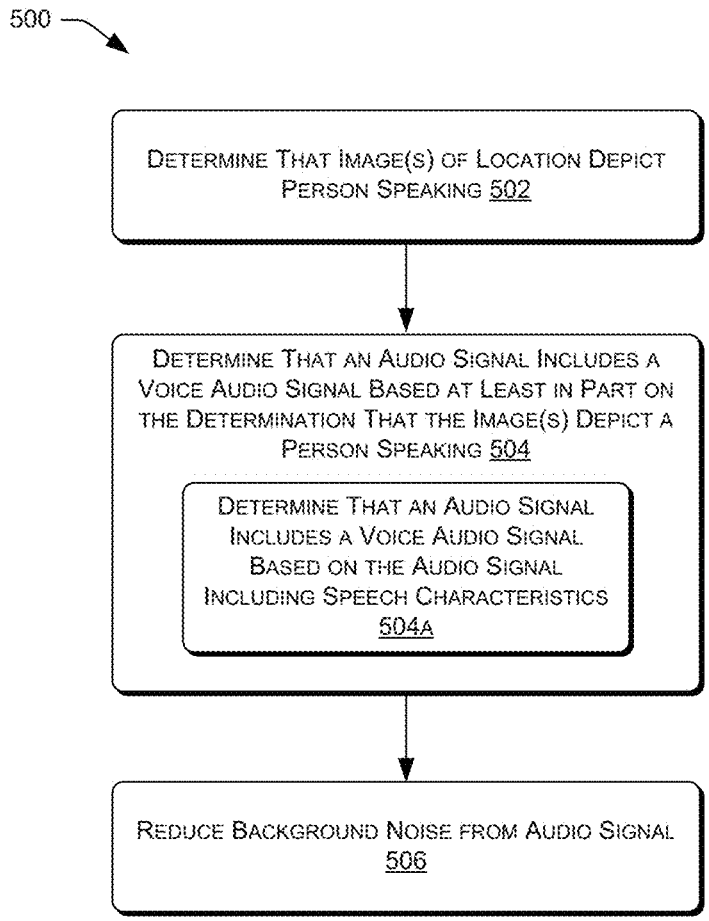
FIG. 5 illustrates an example process for using visual cues to determine when a person is speaking at the location and reducing background noise from the audio signal in response.

FIG. 5 illustrates an example process 500 for using visual cues to determine when a person is speaking at a location and reducing background noise from the audio signal in response. The process 500 includes, at 502, a visual cues module determining that image(s) of a location depict a person at the location engaged in speaking. In some embodiments, this determining includes determining if multiple images of the location show a movement of the person's lips in a specified time period. The visual cues module then provides an indication to a voice activity detector associated with an acoustic echo canceller of a device at the location that the person is engaged in speaking.

At 504, the voice activity detector determines that an audio signal captured by the device includes a voice. The voice activity detector makes this determination based at least in part on the received indication. At 504a, the voice activity detector also utilizes speech characteristic to determine if the audio signal includes a voice. The voice activity detector then informs a noise reduction module of the device that the audio signal includes a voice.

At 506, responsive to being informed of the voice, the noise reduction module may learn background noise characteristics when no voice activity is detected over a specific time span. The noise reduction module may then use these background noise characteristics in reducing the background noise.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
    ascertaining, from one or more images of a location, that a person at the location is speaking;
    detecting, by at least one of a double-talk detector of an acoustic echo processor or by a voice activity detector of the acoustic echo processor, that an audio signal associated with a voice is generated by a microphone at the location;
    determining, by the acoustic echo processor, a confidence score indicating a likelihood that the audio signal is associated with the person at the location;
    adjusting, by the acoustic echo processor, the confidence score based at least in part on the one or more images depicting the person at the location engaged in speaking;
    determining that the confidence score exceeds a threshold;
    changing, by the acoustic echo processor, adaptation of a filter of the acoustic echo processor based at least in part on the confidence score exceeding the threshold and the detecting the audio signal associated with the voice; and
    removing, at least in part, background noise from the audio signal based at least in part on the confidence score exceeding the threshold, wherein an amount of the background noise removed from the audio signal is based at least in part on a known echo path of the location.

2. The method of claim 1, wherein the detecting that the audio signal associated with the voice into the microphone is performed by the double-talk detector and the method further comprises:
    receiving, by the double-talk detector, an indication that the one or more images of the location depict the person at the location engaged in speaking, and
    adjusting the confidence score based on the indication.

3. The method of claim 1, wherein the detecting that the audio signal associated with the voice into the microphone is performed by the voice activity detector and the method further comprises:
    receiving, by the voice activity detector, an indication that the one or more images of the location depict the person at the location engaged in speaking, and
    adjusting the confidence score based on the indication.

4. The method of claim 1, wherein the method further comprises:
    determining, based at least in part on the one or more images, that an item at the location has changed position;
    determining that the change in position of the item is associated with a corresponding change in the known echo path; and
    accelerating the adaptation of the filter based at least in part on determining that the change in position of the item is associated with the corresponding change in the known echo path.

5. The method of claim 1, wherein the ascertaining comprises determining if the one or more images of the location show movement of lips of the person in a specified time period.

6. The method of claim 1, wherein the method further comprises:
    determining that the location does not include people;
    capturing audio at the location with the microphone based at least in part on determining that the location does not include people; and determining the known echo path based at least in part on the audio captured at the location.

7. The method of claim 1, wherein the changing comprises halting or slowing the adaptation of the filter based at least in part on a determination that the confidence score exceeds the threshold.

8. The method of claim 1, wherein the method further comprises:
determining that the audio signal associated with the voice is no longer detected by the microphone; and
resuming the adaptation of the filter.

9. The method of claim 1, wherein the method further comprises removing, at least in part, an acoustic echo from the audio signal, wherein an amount of the acoustic echo removed from the audio signal is based at least in part on the known echo path.

10. One or more non-transitory computer-readable media having computer-executable instructions stored thereon and configured to program a computing device to perform operations comprising:
ascertaining, from one or more images of a location, that a person at the location is speaking;
capturing an audio signal by a microphone at the location;
detecting that the audio signal is associated with a human voice;
determining a first confidence score based at least in part on a first indication that the human voice is associated with the person at the location;
determining a second confidence score based at least in part on a second indication that the one or more images depict the person at the location engaged in speaking, the second confidence score being greater than the first confidence score;
changing adaptation of a filter of an acoustic echo processor based at least in part on at least one of the first confidence score or the second confidence score and the audio signal; and
removing, at least in part, background noise from the audio signal based at least in part on the at least one of the first confidence score or the second confidence score, wherein an amount of the background noise removed from the audio signal is based at least in part on a known echo path of the location.

11. The non-transitory computer-readable media of claim 10, wherein the detecting that the audio signal is the human voice is performed by at least one of a double-talk detector of the acoustic echo processor or by a voice activity detector of the acoustic echo processor.

12. The non-transitory computer-readable media of claim 11, wherein the detecting that the audio signal is the human voice is performed by the double-talk detector and the operations further comprise:
receiving, by the double-talk detector, an indication that the one or more images of the location depict the person at the location engaged in speaking, and
determining the second confidence score based at least in part on the indication.

13. The non-transitory computer-readable media of claim 11, wherein the detecting that the audio signal is the human voice is performed by the voice activity detector and the operations further comprise:
receiving, by the voice activity detector, an indication that the one or more images of the location depict the person at the location engaged in speaking, and
adjusting based on the indication.

14. The non-transitory computer-readable media of claim 10, wherein the operations further comprise receiving an indication that the person at the location is engaged in speaking, the receiving performed by the acoustic echo processor.

15. The non-transitory computer-readable media of claim 10, wherein the ascertaining comprises determining whether the one or more images of the location show movement of lips of the person in a specified time period.

16. The non-transitory computer-readable media of claim 10, wherein the changing comprises halting or slowing the adaptation of the filter based at least in part on a determination that the first confidence score or the second confidence score exceeds a threshold.

17. The non-transitory computer-readable media of claim 10, the operations further comprising determining that a subsequent audio signal is not associated with a human voice and resuming the adaptation of the filter.

18. The non-transitory computer-readable media of claim 10, the operations further comprising performing acoustic echo processing on the audio signal to remove, at least in part, an acoustic echo.

19. A system comprising:
one or more processors;
a camera to capture one or more images of a location;
a speaker to output audio in the location;
a microphone to capture audio in the location; and
one or more non-transitory computer-readable media having computer-executable instructions stored thereon and configured to program the one or more processors to perform operations comprising:
ascertaining, from the one or more images of the location captured by the camera, that a person at the location is speaking;
capturing an audio signal by the microphone in the location;
detecting that the audio signal is associated with a voice;
determining a confidence score that the audio signal represents the voice that is associated with the person at the location;
adjusting the confidence score based at least in part on the one or more images captured by the camera depicting the person at the location engaged in speaking;
determining that the confidence score exceeds a threshold;
changing adaptation of a filter of an acoustic echo processor based at least in part on the confidence score exceeding the threshold and the audio signal; and
removing, at least in part, background noise from the audio signal based at least in part on the confidence score exceeding the threshold, wherein an amount of the background noise removed from the audio signal is based at least in part on a known echo path of the location.

20. The system of claim 19, wherein the detecting that the audio signal is associated with the voice is performed by a double-talk detector of the acoustic echo processor or by a voice activity detector of the acoustic echo processor.

21. The system of claim 20, wherein the detecting that the audio signal is associated with the voice is performed by the double-talk detector and the operations further comprise:
receiving, by the double-talk detector, an indication that the one or more images of the location depict the person at the location engaged in speaking, and
adjusting the confidence score based on the indication.

22. The system of claim 20, wherein the detecting that the audio signal is associated with the voice is performed by the voice activity detector and the operations further comprise:
  receiving, by the voice activity detector, an indication that the one or more images of the location depict the person at the location engaged in speaking, and
  adjusting the confidence score based on the indication.

23. The system of claim 19, wherein the operations further comprise:
  determining, from one or more subsequent images of the location captured by the camera, that the location does not include people;
  playing a calibration sound by the speaker;
  determining one or more echo paths of the location based on audio captured by the microphone at the location while the calibration sound is playing;
  calibrating the acoustic echo canceller filter based at least in part on the one or more echo paths; and
  learning background noise characteristics in the audio captured by the microphone at the location based at least in part on no voice activity being detected.

24. The method of claim 1, wherein determining the confidence score indicating the likelihood that the audio signal is associated with the person at the location further comprises:
  accessing at least one stored speech characteristic associated with a voice profile corresponding to the person;
  determining a comparison between the at least one stored speech characteristic and a characteristic of the audio signal; and
  determining the confidence score based at least in part on the comparison.

* * * * *